C. F. WALLACE & M. F. TIERNAN.
HYDRAULIC METERING AND MEASURING DEVICE.
APPLICATION FILED NOV. 11, 1916.
1,285,495.
Patented Nov. 19, 1918.
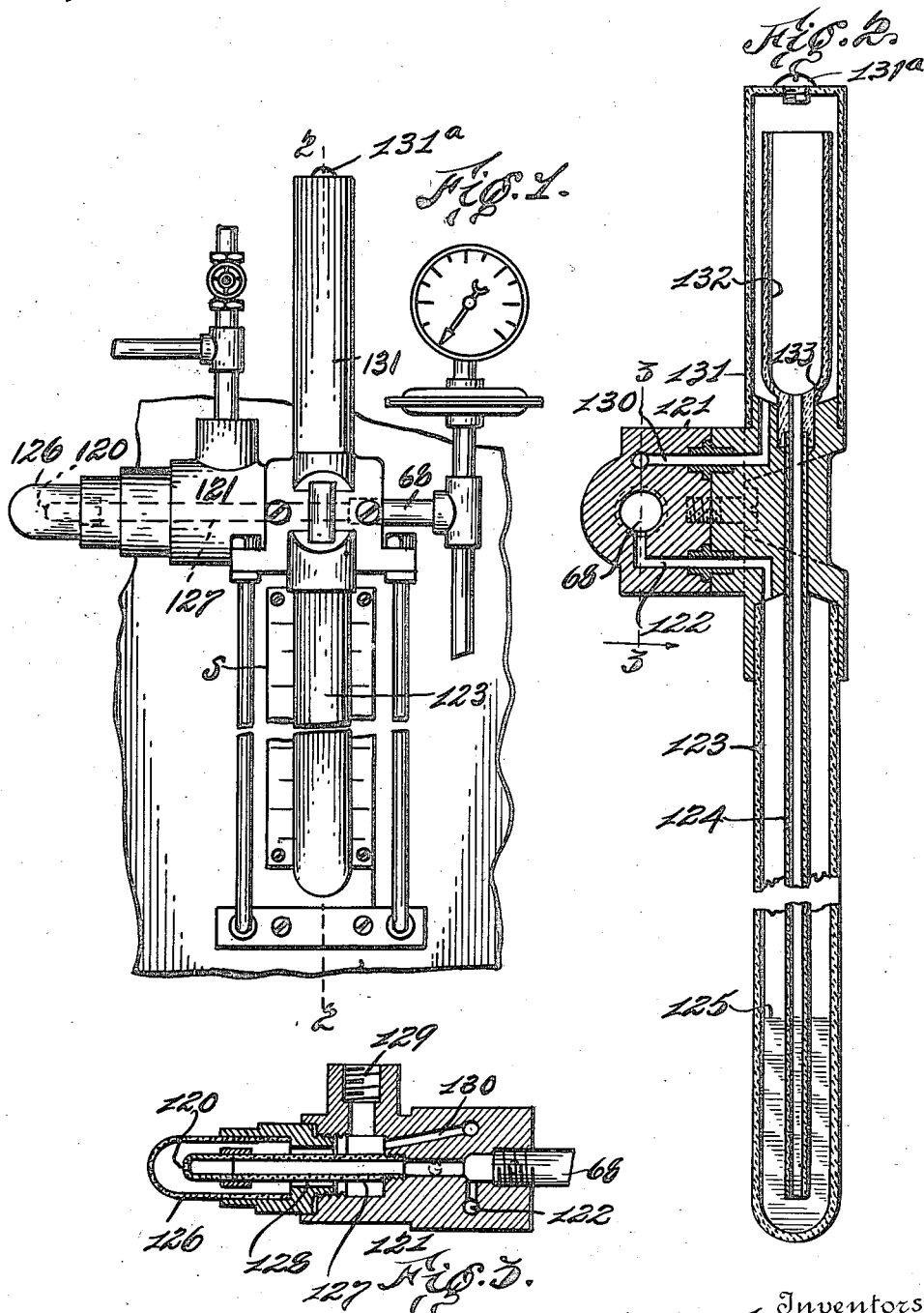

UNITED STATES PATENT OFFICE.

CHARLES F. WALLACE, OF NEW YORK, AND MARTIN F. TIERNAN, OF NEW ROCHELLE, NEW YORK.

HYDRAULIC METERING AND MEASURING DEVICE.

1,285,495. Specification of Letters Patent. Patented Nov. 19, 1918.

Original application filed March 26, 1915, Serial No. 17,122. Divided and this application filed November 11, 1916. Serial No. 130,758.

*To all whom it may concern:*

Be it known that we, CHARLES F. WALLACE and MARTIN F. TIERNAN, citizens of the United States, residing at Tompkinsville, borough of Richmond, city and State of New York, and New Rochelle, county of Westchester and State of New York, respectively, have invented certain new and useful Improvements in Hydraulic Metering and Measuring Devices, of which the following is a clear, full, and exact description.

This invention relates to hydraulic metering and measuring devices, such as disclosed in our application for patent filed March 26, 1915, Serial No. 17,122, of which this application is a division.

Said application discloses apparatuses and processes for the treatment or the purifying of water, etc., and the present invention is restricted to a form of hydraulic metering and measuring device which may be used in connection with such apparatus, although the invention is not restricted to use in connection with apparatuses and processes specifically disclosed in the aforesaid application. One of the objects of the present invention is to provide means for metering and measuring gases, which is hydraulic in principle and of great simplicity and permanent accuracy. In the form of the invention shown herein, it comprises a fixed orifice associated with a manometer for measuring the gas or flowing substance which flows past the fixed orifice. Another object of the invention is to construct the metering and measuring device in part, at least, of a material which cannot be acted upon by such a gas as chlorin, glass being preferably used in this connection, as it is not acted upon by chlorin which is inert to glass, nor is it volatile. Another object of the invention is to provide an inclosed type of manometer. Another object of the invention is to provide a manometer of such a construction that a small downward deflection of the liquid therein will cause a comparatively large rise of said liquid, whereby the measure of the drop in pressure across the fixed orifice, and consequently an indication of the amount of gas flowing through the line, may be ascertained. Another object of the invention is to provide a manometer which will not be affected by an excessive flow of gas. Still another object of the invention is to provide a simple, practical and efficient hydraulic metering and measuring device for gases or flowing substances.

These being among the objects of the present invention, the same consists of certain features of construction and combinations of parts to be hereinafter described and then claimed with reference to the accompanying drawings illustrating a desirable embodiment of the invention, and in which—

Figure 1 is a front elevation of an associated manometer and flow-meter, together with concomitant parts;

Fig. 2 is an enlarged section on the line 2—2 Fig. 1 of the manometer; and

Fig. 3 is a section on line 3—3, Fig. 2, of the flow-meter.

The flow-meter, composed of parts 120, etc., is located in a break in the line or pipe 68 and the manometer composed of parts 123, etc., is located in the pipe 68 between the fixed orifice member 120 of the flow-meter and any control valve such for instance as disclosed in our aforesaid application, if a control valve is used in connection with the present invention. The two sections of the pipe 68 are joined to a head or body 121, and communicating with the pipe 68 is a branch passage 122 in said head which also communicates with a tube 123, which is closed at its lower end to form a pocket. Extending into this closed tube 123 is a tube 124 which is open from end to end, its upper end being fixed in a bore in the metal head 121. The lower end of the inner tube 124 terminates a suitable distance above the closed lower end of the outer tube 123, so that a body of liquid 125 in the lower end of the outer tube may be caused to move in the inner tube 124. The cross sections of the two tubes differ materially as the inner tube is considerably smaller than the outer tube.

Preferably the said tubes 123, 124, are composed of glass, because chlorin in the presence of most liquids has a very corrosive action on metals, and it is found that glass is about the only practical material to use for containing a liquid body such as 125, which is not acted upon by chlorin, nor is volatile, but is inert to gas. By means of the inclosed type of manometer involved herein, no part of the metal of the head 121 comes in contact with any liquid or acid which may be used. The head 121 is provided with a lateral passage 130 which leads into the lower end of a chamber 131 fixed on top of the head, said chamber being substantially in line with the tubes 123, 124. Located in the said chamber is a receptacle or vessel 132 in the general form of an inverted bell, and its lower end is provided with a neck 133 which is inserted into the upper end of the head so that the upper end of the inner glass tube 124 may enter it. The said receptacle 132 and its neck 133 are also preferably composed of glass for the reasons given.

Before describing the operation of the manometer, the orifice member 120 and its mounting will be described. This device preferably involves the head 121 of the manometer, although it may be made as a separate part and comprises in addition to said head and the aforesaid fixed orifice member 120, a glass chamber or cap 126 which is suitably mounted on the head 121 so as to cover the orifice of said member and provide means for inspecting the orifice at any time without interfering with the flow of gas. The fixed orifice member 120, preferably made of glass, is located at the end of a short pipe section 127 which is inserted in the head and connects with the pipe 68, so that the described manometer is located in the line ahead of said fixed orifice member. There is an annular passage 128 around the pipe section 127 which leads from the fixed orifice member 120 to the outlet 129 to the line. From this outlet there extends the before mentioned lateral passage 130 to the manometer chamber 131, so that the said connection 130 is after the orifice member 120 in the direction in which the flow of gas through the line occurs.

The operation of the described associated device is as follows: When a flow of gas occurs through the fixed orifice member 120, there will be a drop in pressure across the orifice thereof, said drop being communicated to the manometer and being readable from a scale $s$ back of the glass tubes. The greater pressure on the surface of the body of liquid 125 in the outer tube 123 causes the liquid to rise in the smaller tube 124, and the difference in cross section of these tubes being comparatively great, a small downward deflection of the liquid in the outer tube will cause a comparatively large rise of the liquid in the inner tube. This deflection is a measure of the drop in pressure across the orifice of member 120 and consequently an indication of the amount of chlorin flowing through the line, being readable from said scale. If for any reason there should be an excessive flow of chlorin tending to blow the liquid out of the lower part of the outer tube 123, the liquid will be forced up through the inner tube 124 and into the open receptacle or vessel 132 which therefore acts as a safety trap for said liquid. As this receptacle has a capacity greater than the amount of liquid employed, it will prevent any of the liquid from coming in contact with the metal parts and being of glass will prevent corrosion. Said receptacle will also hold the liquid and prevent it from running down into the lateral passage 130 after the fixed orifice member 120. When the extreme flow of gas ceases, the liquid will flow back into the lower chamber or pocket of the outer glass tube 123. The glass cap or chamber 126 of the flow-meter permits any obstruction of the fixed orifice member 120 to be seen, which obstruction might interfere with the accuracy of the apparatus. The upper chamber 131 of the manometer should be provided with a filling orifice located above the open upper end of the receptacle 132, said orifice being closed as by a suitable plug $131^a$. This enables the charge of liquid to be supplied to the outer tube 123.

The fixed orifice member 120 may be replaced by a body of porous material, such as carborundum, emery, etc., one of the objects of this material or medium being to offer resistance to the gas so that the difference in pressure of said gas may be measured before and after it passes therethrough. This is specifically covered in our co-pending application entitled Process of and apparatus for ascertaining the rate of flow of gases or liquids, and was first disclosed in our co-pending application filed March 26, 1915, Serial No. 17,122.

It is obvious that the invention is susceptible of modification, as parts may be omitted, parts added, and parts substituted without departing from the spirit and scope thereof as expressed in the claims.

What we claim as new is:—

1. In apparatus of the class described, a manometer comprising in combination, a head provided with ducts having suitable connection one with the other, two pendent glass tubes carried by said head, one of said tubes being directly connected with one of said ducts, and the other being located inside of and adapted to dip into a body of liquid in the first said tube, said inner tube being connected at its upper end with the other duct, and a safety trap for said liquid, located between said other duct and said upper end of the inner tube.

2. In apparatus of the class described, a manometer comprising in combination, a head provided with ducts having suitable connection one with the other, two glass tubes carried by said head, one of said tubes being directly connected with one of said ducts, and the other being located inside of and adapted to dip into a body of liquid in the first said tube, said inner tube being connected with the other duct, and a chamber carried by said head and containing a glass pocket projecting thereinto and communicating with said inner tube, said pocket constituting a safety trap for said liquid.

3. In apparatus of the class described, a manometer comprising in combination two elongated chambers, and means for supporting them substantially in the line of their longitudinal axes one above the other, the lower chamber being composed of a transparent tube and communicating as herein described at its upper end with the lower end of the other chamber, and a smaller transparent tube depending from said support and extending down into said lower chamber so as to be adapted to dip into a body of liquid therein, and its upper end communicating with said upper chamber.

4. In apparatus of the class described, a manometer comprising in combination two chambers, means for supporting them one above the other, the lower chamber being composed of a transparent tube and communicating as herein described at its upper end with the lower end of the other chamber, and a smaller transparent tube depending from said support and extending down into said lower chamber so as to be adapted to dip into a body of liquid therein, and a pocket projecting into said upper chamber and leading to said inner tube, said pocket constituting a safety trap for said liquid.

5. In apparatus of the class described, a manometer comprising in combination two elongated glass chambers, means for supporting them substantially in the line of their longitudinal axes one above the other, the lower chamber communicating as herein described at its upper end with the lower end of the other chamber, and a transparent tube depending from said support and extending down into said lower chamber so as to be adapted to dip into a body of liquid therein, and a glass pocket extending upwardly into said upper chamber and leading to the upper end of said inner tube.

6. In apparatus of the class described, a flow-meter comprising, in combination, a hollow head provided with an inlet for the fluid to be metered, a tube or pipe leading from said inlet and projecting into the chamber formed by said hollow head, a fixed orifice member at the projecting discharge end of said tube, a cap mounted on said head over the orifice of said member, and an outlet leading from said chamber to a point of distribution of said fluid.

Signed at New York, N. Y., this 8" day of November, 1916.

CHARLES F. WALLACE.
MARTIN F. TIERNAN.

Witnesses:
BEATRICE MIRVIS,
ABRAHAM BERNSTEIN.